United States Patent
Jia

(10) Patent No.: US 10,602,135 B2
(45) Date of Patent: Mar. 24, 2020

(54) VIDEO PROCESSING METHOD, DEVICE AND TERMINAL

(71) Applicant: AutoChips Inc., Hefei (CN)

(72) Inventor: Shen Jia, Hefei (CN)

(73) Assignee: AUTOCHIPS INC., Hefei (CN)

(*) Notice: Subject to any disclaimer, the term of this patent is extended or adjusted under 35 U.S.C. 154(b) by 20 days.

(21) Appl. No.: 15/928,110

(22) Filed: Mar. 22, 2018

(65) Prior Publication Data

US 2018/0278929 A1 Sep. 27, 2018

(30) Foreign Application Priority Data

Mar. 23, 2017 (CN) .......................... 2017 1 0179888

(51) Int. Cl.
*H04N 19/103* (2014.01)
*H04N 19/70* (2014.01)
*H04N 19/42* (2014.01)
*H04N 19/89* (2014.01)
*H04N 19/44* (2014.01)

(52) U.S. Cl.
CPC ............ *H04N 19/103* (2014.11); *H04N 19/42* (2014.11); *H04N 19/44* (2014.11); *H04N 19/70* (2014.11); *H04N 19/89* (2014.11)

(58) Field of Classification Search
CPC .. H04N 19/103; H04N 19/127; H04N 19/156; H04N 19/89
USPC ...................................................... 375/240.25
See application file for complete search history.

(56) References Cited

U.S. PATENT DOCUMENTS

2014/0146895 A1* 5/2014 Xu .......................... H04N 19/44
375/240.25

FOREIGN PATENT DOCUMENTS

| CN | 101123723 A | 2/2008 |
| CN | 104780378 A | 7/2015 |

* cited by examiner

*Primary Examiner* — Dominic D Saltarelli

(57) ABSTRACT

The present disclosure discloses a video processing method, comprising: receiving a video file; decoding the video file using a first decoding mode; and when an occurred decoding exception is detected in a first decoding process using the first decoding mode, switching the current first decoding mode to a second decoding mode automatically, and continuing to decode a remaining part of the video file using the second decoding mode; wherein one of the first decoding mode and the second decoding mode is a hardware decoding mode, and the other is a software decoding mode.

16 Claims, 4 Drawing Sheets

VIDEO PROCESSING METHOD, DEVICE AND TERMINAL

CROSS-REFERENCE TO RELATED APPLICATIONS

This application claims all benefits accruing under 35 U.S.C. § 119 from China Patent Application No. 201710179888.3, field on Mar. 23, 2017 in the China Intellectual Property Office, the contents of which are hereby incorporated by reference.

TECHNICAL FIELD

The disclosure generally relates to a multimedia technology, and more particularly, to a video processing method, a device and a terminal.

BACKGROUND

A video decoding refers to a process of decompressing an encoded video data. There are mainly two decoding modes, one is decoding using software, i.e., a software decoding mode, and the other is decoding using hardware, i.e., a hardware decoding mode. After decompressing the video data, displaying the decompressed video data or signal.

Currently, in general, when starting to decode a video file, i.e., before the video file is played, people can choose a hardware decoding mode or a software decoding mode by themselves. However, once a decoding mode is chosen, the decoding mode cannot be changed. It can only use the decoding mode which has been chosen. Furthermore, during a video decoding process, the decoding mode cannot be switched automatically. If the people want to switch the decoding mode, they need to exit the decoding process. It can only manually re-choose the decoding mode before the video file is played, and re-decoding the video file from a first frame of the video file, so that the operating efficiency is low. In addition, in the video decoding process, once a decoding exception occurs, it can only exit the video decoding process. Therefore, the video decoding process is failed, and it needs to re-choose other decoding mode to decode manually, so that the operating efficiency is low and it is a poor user experience.

Although most of current video decoding processes use a hardware decoding mode, the hardware decoding mode may not be able to decode normally due to hardware limitations and in some special cases. In this case, a software decoding mode may be able to decode normally. Similarly, when using the software decoding mode to decode a video file, as the decoding proceeds, the software decoding Mode may not be able to decode normally. For example, as the decoding proceeds, a decoding speed is slow due to a high CPU load or an insufficient memory, which causes that a time of completed decoding is longer than a time of displaying, and resulting in a frame dropping, a screen being clogging, a black screen or a screen sticking, so that the visual effect is poor. In this case, the hardware decoding mode may be able to decode normally, and the hardware decoding has low power consumption, a CPU load is relatively low. Therefore, in the video decoding process, it needs to switch the decoding mode automatically, so as to improve the decoding efficiency.

SUMMARY

The purpose of the present disclosure is to provide a video processing method, a device and a terminal, which may switch the decoding mode during the decoding process automatically, to improve the decoding efficiency.

The technical solution adopted by the present disclosure for solving the above-mentioned technical problem is to provide A video processing method, comprising: receiving a video file; decoding the video file using a first decoding mode; and when an occurred decoding exception is detected in a first decoding process using the first decoding mode, switching the current first decoding mode to a second decoding mode automatically, and continuing to decode a remaining part of the video file using the second decoding mode; wherein the first decoding mode is a hardware decoding mode and the second decoding mode is a software decoding mode, or the first decoding mode is a software decoding mode and the second decoding mode is a hardware decoding mode.

The technical solution adopted by the present disclosure for solving the above-mentioned technical problem is further to provide a apparatus for video processing, comprising one or more electronic circuit or processors arranged to: receiving a video file; decoding the idea file using a first decoding mode; and when an occurred decoding exception is detected in a first decoding process using the first decoding mode, switching the current first decoding mode to a second decoding mode automatically, and continuing to decode a remaining part of the video file using the second decoding mode; wherein the first decoding mode is a hardware decoding mode and the second decoding mode is a software decoding mode, or the first decoding mode is a software decoding mode and the second decoding mode is a hardware decoding mode.

The technical solution adopted by the present disclosure for solving the above-mentioned technical problem is to provide a terminal comprising a memory, a driver, and a processor, wherein the memory is used for storing an instruction set to be executed by the processor; wherein the instruction to be executed by the processor is used for controlling the driver to process the video file using a video processing method; wherein the video processing method comprises: receiving a video file; decoding the video file using a first decoding mode; and when an occurred decoding exception is detected in a first decoding process using the first decoding mode, switching the current first decoding mode to a second decoding mode automatically and continuing to decode a remaining part of the video file using the second decoding mode; wherein the first decoding mode is a hardware decoding mode and the second decoding mode is a software decoding mode, or the first decoding mode is a software decoding mode and the second decoding mode is a hardware decoding mode.

The above-mentioned video processing method, device and terminal provided by the present disclosure, if a decoding exception is occurred in the video decoding process, it may switch the decoding mode automatically, so as to improve the decoding efficiency.

BRIEF DESCRIPTION OF DRAWINGS

Detailed description will be given with respect to preferred embodiments provided and illustrated here below in accompanied drawings.

DETAILED DESCRIPTION in order to give a better and thorough understanding to the whole and other intended purposes, features and advantages of the technical solution of the present disclosure, detailed description will be given with respect to preferred embodiments provided and illustrated here below in accompanied drawings.

Figure 1:
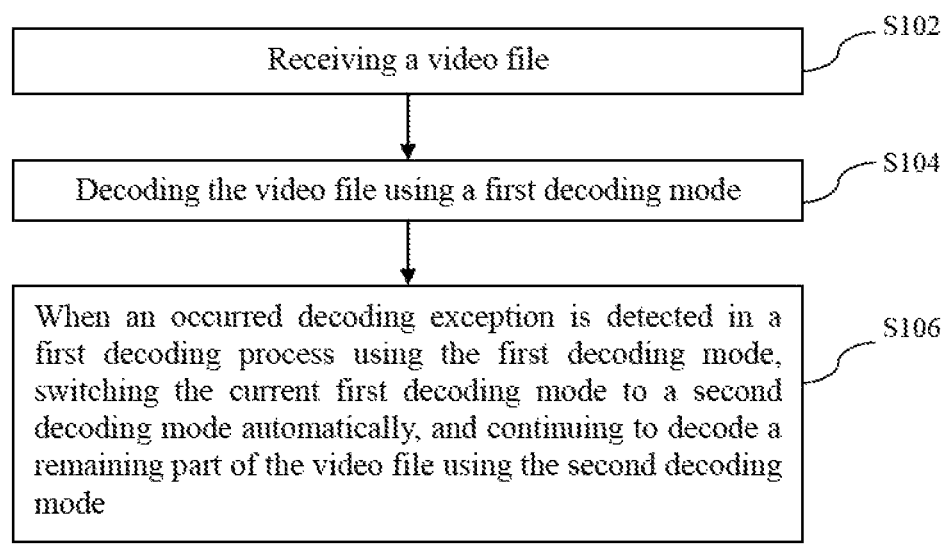
FIG. 1 is a flowchart of a video processing method in accordance with a first embodiment of the present disclosure.

As shown in FIG. 1, FIG. 1 is a flowchart of a video processing method in accordance with a first embodiment of the present disclosure. The method may comprise:

Block S102: receiving a video file.

The video files may comprise digital videos. In other embodiments, if an audio needs to be decoded, receiving the corresponding audio file, and subsequent blocks may be performed according to the audio file.

Block S104: decoding the video file using a first decoding mode.

The first decoding method may be a hardware decoding method or a software decoding method. In the understanding of people skilled in the art, decoding a file using the hardware decoding method and decoding a file using the software decoding method, may be all belong to the related art, therefore no additional description is given herebelow.

Block 106: When an occurred decoding exception is detected in a first decoding process Using the first decoding mode, switching the current first decoding mode to a second decoding mode automatically, and continuing to decode a remaining part of the video file using the second decoding mode.

When an occurred decoding exception is detected in a first decoding process using the first decoding mode, the first decoding mode may be switched to a second decoding mode automatically, and a remaining part of the video file may continue to be decoded using the second decoding mode. Specifically, in an embodiment, when the occurred decoding exception is detected in a first decoding process using the first decoding mode, the decoding exception may be determined whether the decoding exception reaches a default tolerance. If the decoding exception reaches the default tolerance, the first decoding mode may be switched to the second decoding mode, and the decoding process may continue. The default tolerance may be a degree of the decoding exception, e.g., a number of lost frames during the decoding process and the like. When the first decoding mode is the hardware decoding mode, the second decoding mode may be the software decoding mode. Similarly, when the first decoding mode is the software decoding mode, the second decoding mode may be the hardware decoding mode.

In an embodiment, the first decoding mode may be the hardware decoding mode. The decoding exception during the decoding process may comprise at least one of followings: a parsing error of a key field syntax element that occurs in decoding, a decoding time out, a frame loss reaching a ceiling, insufficient hardware resources, a mismatch between video types supported by hardware decoding and video types of video files to be decoded, incomplete data, and a data alignment that does not meet requirements of the hardware. The decoding time out may be due to properties of the video file exceeding limitations of the hardware (referring to a drive), e.g., a resolution, a bit rate, a frame rate, or a data integrity. The frame loss reaching the ceiling may be due to special or incorrect video data. The insufficient hardware resources may be due to an insufficient hardware resource that the drive can not apply, e.g., a memory. In other embodiments, the first decoding mode may be the software decoding mode. The decoding exception during the decoding process may comprise at least one of followings: a processor load exceeding a predetermined value in decoding, a frame loss exceeding a delimit Value, a decoding completion time being later than a decoding display time. The software decoding mode may mainly occupy a processor. When the processor load exceeds the predetermined value in the decoding process, it may indicate that the processor load is too high. In this case, the decoding exception occurs, so that displayed pictures are stuck, and the visual effect is poor. The decoding completion time being later than the decoding display time, which may indicate that the frame may be discarded. In this case, the decoding exception occurs, so that the displayed picture has been stuck for a certain period of time, and the visual effect is poor.

In an embodiment, when the second decoding mode continues to decode the remaining part of the video file, if an occurred decoding exception is detected, it may indicate that decoding exceptions occur in both the first decoding mode and the second decoding mode. In this case, the decoding of the video file may be stopped.

In the present embodiment, if a decoding exception occurs in the video decoding process, it may switch the decoding mode automatically, to improve the decoding efficiency and the user experience.

In an embodiment, the continuing to decode the remaining part of the video file using the second decoding mode, may comprise: obtaining current decoding information when the decoding exception occurs. The current decoding information may comprise a location of an error frame, a location of a previous key frame of the error frame, and a path of the video file to be played; and the second decoding mode may continue to decode the remaining part of the video file from the previous key frame.

Figure 2:
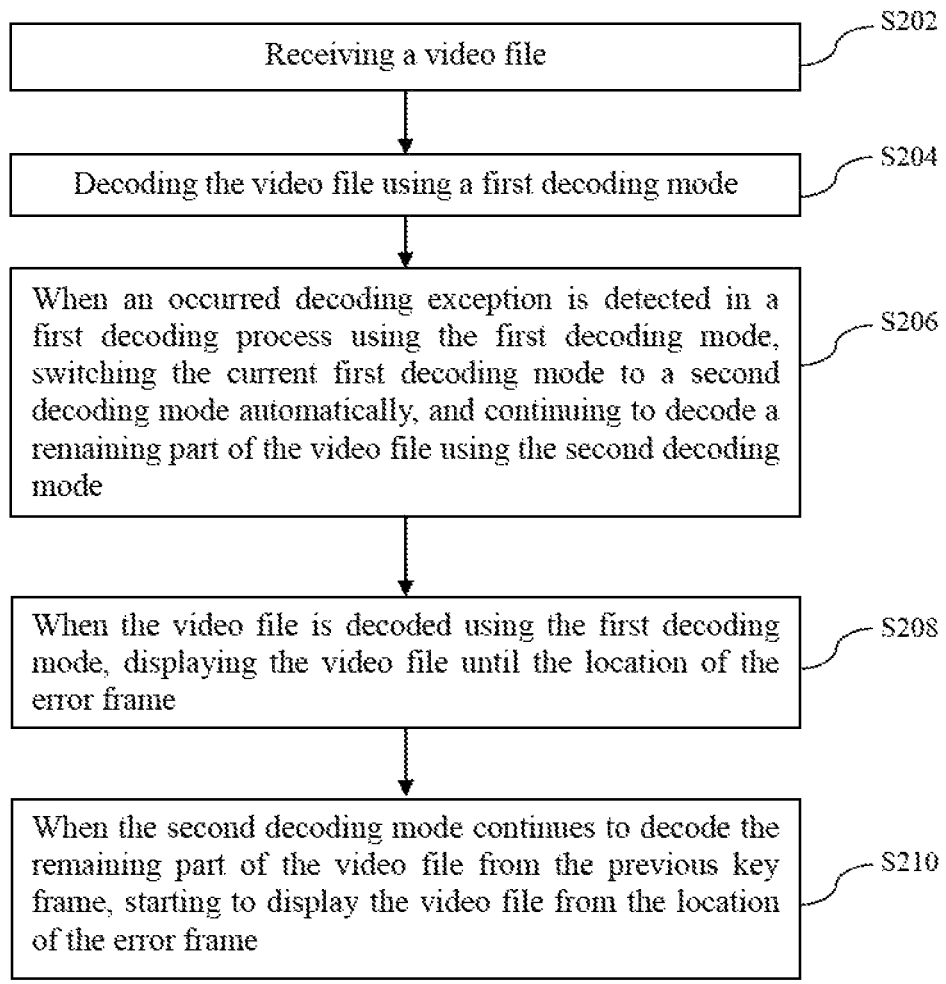
FIG. 2 is a flowchart of a video processing method in accordance with a second embodiment of the present disclosure.

Further, as shown in FIG. 2, FIG. 2 is a flow chart of a video processing method in accordance with a second embodiment of the present disclosure. Based on the above-mentioned first embodiment, the video processing method may further comprise:

Block S208: when the video file is decoded using the first decoding mode, displaying the video file until the location of the error frame.

When the video file is decoded using the first decoding mode, the video file may be displayed until the location of the error frame. In this case, the displayed frame may stay in the location of the error frame.

Block S210: when the second decoding mode continues to decode the remaining part of the video file from the previous key frame, starting to display the video file from the location of the error frame.

When a decoding exception occurs in the decoding process of the first decoding mode, the first decoding mode decoding mode may be switched to a second decoding mode automatically. In this case, the remaining part of the video file may continue to be decoded from the previous key frame using the second decoding mode, until decoding to the location of the error frame, and decoded video frames between the previous key frame and the location of the error frame may not be displayed. Afterwards, the video file may continue to be displayed from the location of the error frame.

It should be noticed that, in the understanding of people skilled in the art, the blocks S202 to S206 are the same as the blocks S102 to S106 in the above-mentioned first embodiment, therefore no additional description is given herein. In an embodiment, an execution sequence of the block S208 may be after the block S204, similarly, an execution sequence of the block S210 may be after the block S206. In other embodiments, an execution sequence of the block S208 and the block S210 may be after block S202 and block S204 according to the sequence number.

In addition, for further understanding an open media acceleration (OpenMAX) adopted by the present disclosure, which may achieve that the hardware decoding mode switch to the software decoding mode automatically, or the software decoding mode switch to the hardware decoding mode automatically, the following description of the OpenMAX is given.

Figure 3:
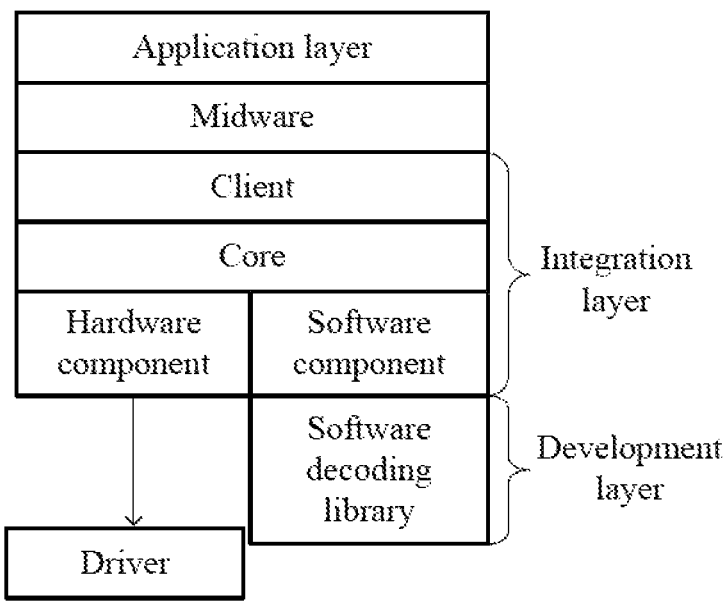
FIG. 3 is a block diagram of a multimedia framework standard adopted in an embodiment of the present disclosure.

As shown in FIG. 3, FIG. 3 is a block diagram of a multimedia framework standard adopted in the embodiment of the present disclosure. The multimedia framework standard may be the OpenMAX, which may comprise: an application layer, an integration layer, and a development layer. The OpenMAX integration layer may comprise a core and a client, a hardware component corresponding to the hard rare decoding mode, and a software component corresponding to the software decoding mode, which may be located at the OpenMAX integration layer respectively, and which may be loaded or unloaded respectively by the client at the OpenMAX integration layer. The core may manager the above-mentioned components.

Further, in an embodiment, the first decoding mode may be the hardware decoding mode. Decoding the video file using the first decoding mode, that is, the video file may be decoded using the hardware decoding mode, which may specifically comprise: loading a first component corresponding to the hardware decoding mode, e.g., a hardware component corresponding to the hardware decoding mode at the OpenMAX; calling a video driver through the first component to hardware-decode the video file. When one of the decoding exceptions occurs in the hardware-decoding, the current first decoding mode may be switched to the second decoding mode automatically. i.e., the hardware decoding method may be switched to the software decoding mode automatically. Specifically, the hardware decoding mode may be stopped, and a second component corresponding to the software decoding mode (e.g., a software component corresponding to the software decoding mode at the Open-MAX) may be loaded, and a software decoding library may be activated, so as to achieve to switch the current first decoding mode to the second decoding mode automatically. In the present embodiment, the hardware decoding mode may achieve that being switched automatically to the software decoding mode by the OpenMAX. In this case, a process of the switching may be only reflected in the OpenMAX client, does not need to switch at the application layer. The stopping the hardware decoding mode and loading the second component corresponding to the software decoding mode and activating the software decoding library, may comprise: unloading the first component corresponding to the hardware decoding mode by the client of the OpenMAX, or disabling the video driver to stop using the hardware decoding mode; and loading the second component corresponding to the software decoding mode by the client of the OpenMAX, and activating the software decoding library. The disabling the video driver may mean the video driver used for hardware-decoding in a hardware (referred to a driver) may be turned off or may be stopped. The activating the software decoding library may mean the software decoding library may be activated in a working state.

In other embodiments, the first decoding mode may be the software decoding mode. Decoding the video file using the first decoding mode, that is, the video file may be decoded using the software decoding mode, which may specifically comprise: loading a second component corresponding to the software decoding mode (e.g., a software component corresponding to a software decoding mode at the OpenMAX); calling the software decoding library through the second component to software-decode the video file. When one of the decoding exceptions occurs in the software-decoding, the current first decoding mode may be switched to the second decoding mode automatically, i.e., the software decoding method may be switched to the hardware decoding mode automatically. Specifically, the stopping the software decoding mode and loading the first component corresponding to the hardware decoding mode and activating the video driver, may comprise: unloading the second component corresponding to the software decoding mode by the client of the OpenMAX, or disabling the software decoding library to stop using the software decoding mode, and loading the first component corresponding to the hardware decoding mode by the client of the OpenMAX and activating the video driver. The disabling the software decoding library may mean the software decoding library does not be used, people skilled in the art may understand the meaning according to the software decoding method. The activating the video driver may mean the video driver is activated in a working state, so as to turn on the video driver.

Figure 4:
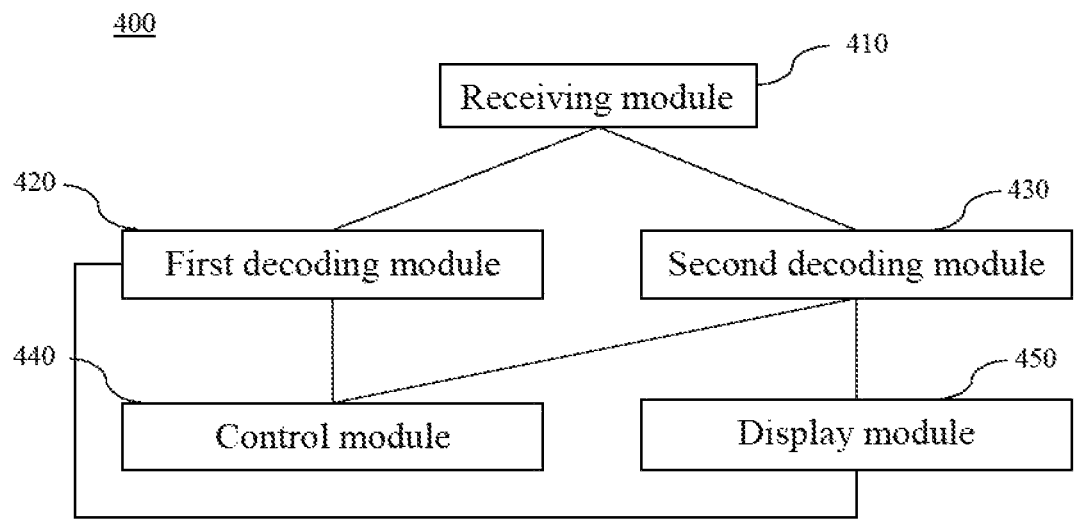
FIG. 4 is a structural illustration of a video processing device iii accordance with an embodiment in the present disclosure.

As shown in FIG. 4, FIG. 4 is a structural illustration of a video processing device in accordance with are embodiment in the present disclosure. The video processing device 400 may comprise a receiving module 410, a first decoding module 420, a second decoding module 430, a control module 440, and a display module 450.

The receiving module 410 may be used for receiving a video file.

The first decoding module 420 may be used for decoding the video file using a first decoding mode. The first decoding method may be a hardware decoding method or a software decoding method.

The control module 440 may be used for controlling to switch the current first decoding mode to a second decoding mode automatically, when a decoding exception occurs in the decoding process of the first decoding mode. Specifically, in an embodiment, the controlling to switch the current first decoding mode to the second decoding mode automatically, may be determined by that whether the decoding exception reaches a default tolerance or not. If the decoding exception reaches the default tolerance, the first decoding mode may be switched to the second decoding mode, and the decoding process may be continued. The default tolerance may be a degree of the decoding exception, e.g., a number of lost frames during a decoding process and the like. When the first decoding mode is the hardware decoding mode, the second decoding mode may be the software decoding mode.

The second decoding module 430 may be used for using the second decoding mode to decode the remaining part of the video file, after controlling to switch the current first decoding mode to the second decoding mode automatically by the control module 440.

Further, when an occurred decoding exception is detected in a first decoding process using the first decoding mode, the control module 440 may be further used for obtaining current decoding information when the decoding exception occurs. The current decoding information may comprise a location of the error frame, and a location of the previous key frame of the error frame. The control module 440 obtains the current decoding information when the decoding exception occurs, the second decoding module 430 may be specifically used for using the second decoding mode to continue decoding the remaining part of the video file from the previous key frame.

The display module 450 may be used for displaying the video file until the location of the error frame, when the first decoding module 420 decodes the video file using the first decoding mode. When the second decoding module 430 uses the second decoding mode to continue to decode the remaining part of the video file from the previous key frame, the video file may be started to display from the location of the error frame. In other embodiments, when the control module 440 switches the current first decoding mode to the second decoding mode automatically, the display module 450 may further be used for displaying messages to users, (e.g., a decoding exception occurs in A decoding mode, switching to B decoding mode automatically), so that the users may understand a real-time decoding state.

Specifically, in an embodiment, when the first decoding mode is a hardware decoding mode, and the first decoding module 420 may comprise a video driving unit and a first component (not shown in figure). The video driving unit may be used for decoding the video file using hardware-decoding. The first component may be used for calling a video driver in the video driving unit to hardware-decode the video file. In the present embodiment, the first component may be a hardware component corresponding to the hardware decoding mode at the OpenMAX.

Further, the first decoding module 420 may be the hardware decoding mode. When the decoding exception occurs, the control module 440 may switch the current hardware decoding mode to the software decoding mode automatically. In this case, the control module 440 may be specifically used for stopping the hardware decoding mode, and loading a second component corresponding to the software decoding mode and activating a software decoding library, so as to switch the current hardware decoding mode to the software decoding mode automatically. In the present embodiment, the control module 440 may use the OpenMAX as shown in FIG. 3 to switch the current hardware decoding mode to the software decoding mode automatically. Specifically, the control module 440 may comprise the client of the OpenMAX, and the client of the OpenMAX may be used for unloading the first component corresponding to the hardware decoding mode, or disabling the video driver to stop using the hardware decoding mode, and loading the second component corresponding to the software decoding mode and activating the software decoding library.

In another embodiment, when the first decoding mode is a software decoding mode, and the first decoding module 420 may comprise a software decoding library and a second component (not shown in figure). The software decoding library may be used for decoding the video file using the software decoding mode. The second component may be used for calling the software decoding library to software-decode the video file. In the present embodiment, the second component may be a hardware component corresponding to the software decoding mode at the OpenMAX.

Further, the first decoding module 420 may use the software decoding mode. When an occurred decoding exception is detected, the control module 440 may switch the current software decoding mode to the hardware decoding mode automatically. In this case, the control module 440 may be specifically used for stopping the software decoding mode, and loading a first component corresponding to the hardware decoding mode and activating a video diver, so as to switch the current software decoding mode to the hardware decoding mode automatically. In the present embodiment, the control module 440 may use the OpenMAX to switch the current software decoding mode to the hardware decoding mode automatically. Specifically, the control module 440 may comprise the client of the OpenMAX, and the client of the OpenMAX may be used for unloading the second component corresponding to the software decoding mode, or disabling the software decoding library to stop using the software decoding mode, and loading the first component corresponding to the hardware decoding mode and activating the video driver.

The above-mentioned modules may correspond to the blocks of executing the above-mentioned embodiments, a specific description refers to the description of the above-mentioned embodiments.

Figure 5:
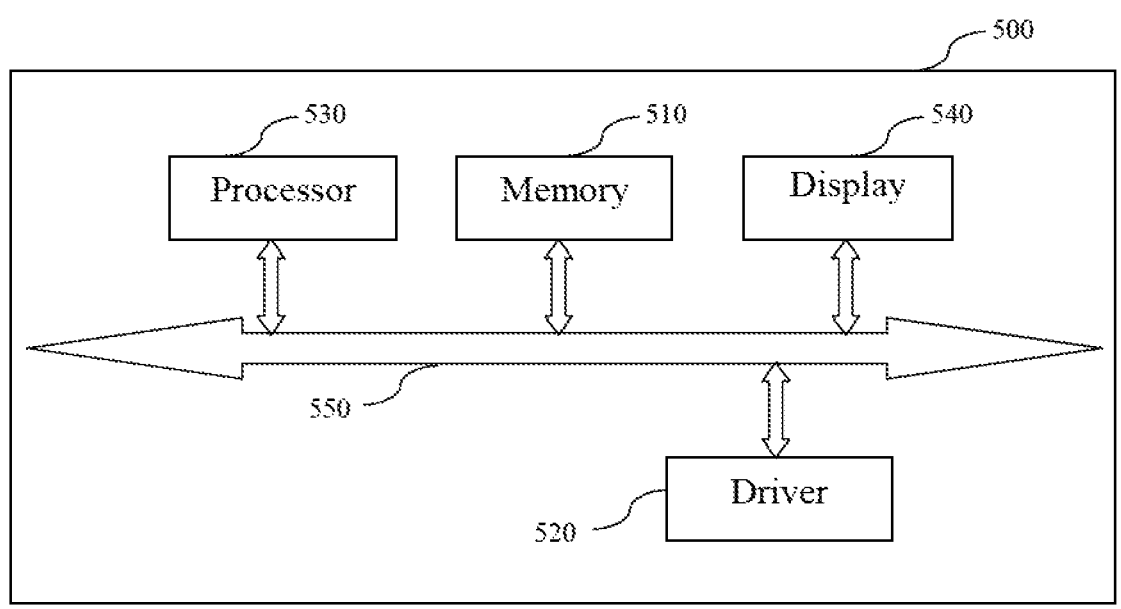
FIG. 5 is a structural illustration of a terminal in accordance with an embodiment in the present disclosure.

As shown in FIG. 5, FIG. 5 is a structural illustration of a terminal in accordance with an embodiment in the present disclosure. The terminal may be used for video processing, and may comprise a memory 510, a driver 520, a processor 530, a display 540 and a bus 550.

The memory 510 may comprise a read-only memory and a random access memory, and provide instructions and data to processor 530. A part of the memory 510 may also comprise a non-volatile random access memory (NVRAM).

The memory 510 may store the following elements: executable modules or data structures, or a subset thereof, or their extensions. For example, operating instructions, which may comprise a variety of operating instructions, and the operating instructions may be used to achieve a variety of operations; and an operating system, which may comprise a variety of system programs, which may be used for implementing a variety of basic services and handling hardware-based tasks.

The driver 520 may be used for hardware-decoding a video file.

In a specific application, components of the terminal may be coupled through the bus 550. The bus 550 may comprise a power bus, a control bus, a status signal bus, and the like in addition to a data bus. However, for a clarity of an illustration, various buses are labeled as bus 550 in figure.

In the present embodiment, the processor 530 may execute operations with operation instructions stored in the memory 510, wherein the operation instructions may be stored in the operating system.

The video file may be decoded using a hardware decoding mode or a software decoding mode by the driver 520.

When an occurred decoding exception is detected in first decoding process using the hardware decoding mode, the current hardware decoding mode may be switched to the software decoding mode automatically and continuing to decode a remaining part of the video file using the software decoding mode.

When an occurred decoding exception is detected in a first decoding process using the software decoding mode, the current software decoding mode may be switched to the hardware decoding mode automatically and continuing to decode a remaining part of the video file by the driver 520.

Further, when a decoding exception occurs in the hardware decoding mode, the processor 530 may continue to decode the remaining part of the video file using the software decoding mode, which may comprise: obtaining current decoding information when the decoding exception occurs. The current decoding information may comprise a location of an error frame, a location of a previous key frame of the error frame, and a path of a video file to be played; and continuing to decode the remaining part of the Video file from the previous key frame using the second decoding mode.

When the decoding exception occurs in the software decoding mode, the processor 530 may control the driver 520 to continue to decode the remaining part of the video file, which may comprise: obtaining current decoding information when the decoding exception occurs. The current decoding information may comprise a location of an error frame, a location of a previous key frame of the error frame, and a path of a video file to be played; and continuing to decode the remaining part of the video file from the previous key frame by the driver 520.

The display 540 may be used for displaying the video file until the location of the error frame when the processor 530 hardware-decodes the video file or software-decodes the video file by controlling the driver 520, and may be used for starting to display the video file from the location of the error frame when the processor 530 continues to decode the remaining part of the video file from the previous key frame when decoding using the software decode mode or when the driver 520 continues to decode the remaining part of the video file from the previous key frame using the hardware decode mode.

Further, in the present embodiment, the processor 530 may use the OpenMAX as shown in FIG. 3 to hardware-decode or software-decode, and switch one of the decoding mode to the other decoding mode automatically when a decoding exception occurs. The processor 530 may hardware-decode the video file by the driver 520, which may comprise: loading a first component corresponding to the hardware decoding mode; and calling a video driver in the driver 520 to hardware-decode the video file through the first component. In the present embodiment, the first component may be a hardware component corresponding to the hardware decoding mode at the OpenMAX.

The current decoding mode may be the hardware decoding mode. When the decoding exception occurs, the processor 530 may switch the current hardware decoding mode to the software decoding mode automatically, which may comprise: stopping the driver 520, and loading a second component corresponding to the software decoding mode, and activating a software decoding library. In the present embodiment, the processor 530 may use the OpenMAX to achieve to switch a decoding mode to the other decoding mode automatically. Specifically, the stopping the driver 520 and loading a second component corresponding to the software decoding mode, and activating a software decoding library. May comprise: unloading the first component corresponding to the hardware decoding mode by the client of the OpenMAX or disabling the video driver in the driver 520 to stop the driver 520; and loading the second component corresponding to the software decoding mode by the client of the OpenMAX, and activating the software decoding library.

The processor 530 software-decodes the video file, which may comprise: loading a second component corresponding to the software decoding mode; and calling a software decoding library to software-decode the video file through the second component. In the present embodiment, the second component may be a software component corresponding to the software decoding mode at the OpenMAX.

The current decoding mode may be the software decoding mode. When the decoding exception occurs, the processor 530 may switch the current software decoding mode to the hardware decoding mode automatically, which may comprise: stopping the software decoding mode, and loading a first component corresponding to the hardware decoding mode and controlling the processor 520 to activate the video driver. In the present embodiment, the processor 530 may use the OpenMAX to achieve to switch a decoding mode to the other decoding mode automatically Specifically, the stopping the software decoding mode and loading a first component corresponding to the hardware decoding mode and controlling the processor 520 to activate the video driver, may comprise: unloading the second component corresponding to the software decoding mode by the client of the OpenMAX or disabling the software decoding library to stop using the software decoding mode, and loading the first component corresponding to the hardware decoding mode by the client of the OpenMAX and controlling the processor 520 to activate the video driver.

The above-mentioned methods disclosed in present embodiment of the present disclosure may be applied to the processor 530 or implemented by the processor 530. The processor 530 may be an integrated circuit chip with a signal processing capability. In the implementing, blocks of the above-mentioned methods may be implemented by integrated logic circuits of hardware in the processor 530, or instructions in software. The above-mentioned processor 530 may be a general purpose processor, a digital signal processor (DSP), an application specific integrated circuit (ASIC), a field programmable gate array (FPGA) or other programmable logic devices, a discrete gate, or a transistor logic, a discrete hardware component, which may implement the blocks, and logic blocks in the embodiments of the present disclosure. The general purpose processor may be a microprocessor, or may also be any conventional processor or the like. The blocks of the method disclosed in the embodiments of the present disclosure may be directly implemented by an execution of a hardware decoding processor, or implemented by a combination of hardware and software modules in the decoding processor. The software module may be located in a storage medium which is well-developed in the art, such as a random access memory, a flash memory, a read only memory a programmable read only memory, an electrically erasable programmable memory, a register and the like. The storage medium may be located in the memory 510, and the processor 530 reads the information in the memory 510 and completes the blocks of the above-mentioned methods in combination with the hardware thereof.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A video processing method, comprising:
receiving a video file;
decoding the video file using a first decoding mode; and
when an occurred decoding exception is detected in a first decoding process using the first decoding mode, switching the current first decoding mode to a second decoding mode automatically, and continuing to decode a remaining part of the video file using the second decoding mode;
wherein the first decoding mode is a hardware decoding mode and the second decoding mode is a software decoding mode, or the first decoding mode is a software decoding mode and the second decoding mode is a hardware decoding mode;
wherein the continuing to decode the remaining part of the video file using the second decoding mode, comprises:
obtaining current decoding information when the decoding exception occurs, wherein the current decoding information comprises a location of an error frame, and a location of a previous key frame of the error frame, wherein the previous key frame of the error frame is decoded by the first decoding mode and not buffered before the switching the current first decoding mode to the second decoding mode automatically; and
re-decoding the previous key frame and continuing to decode the remaining part of the video file using the second decoding mode.

2. The method of claim 1, further comprising:
when the video file is decoded using the first decoding mode, displaying the video file until the location of the error frame; and
when continuing to decode the remaining part of the video file from the previous key frame using the second decoding mode, continuing to display the video file from the location of the error frame.

3. The method of claim 1, wherein the first decoding mode is the hardware decoding mode, and the decoding exception comprises at least one of followings: a parsing error of a key field syntax element that occurs in decoding, a decoding time out, a frame loss reaching a ceiling, insufficient hardware resources, a mismatch between video types supported by hardware decoding and video types of video files to be decoded.

4. The method of claim 3, wherein the decoding the video file using the first decoding mode, comprises:
loading a first component corresponding to the hardware decoding mode;
calling a video driver through the first component to hardware-decode the video file;
wherein the switching the current first decoding mode to the second decoding mode automatically, comprises:
when the occurred decoding exception is detected in the first decoding process using the first decoding mode, stopping using the hardware decoding mode, and loading a second component corresponding to the software decoding mode, and activating a software decoding library.

5. The method of claim 4, wherein the stopping using the hardware decoding mode, loading the second component corresponding to the software decoding mode and activating the software decoding library, comprises:
unloading the first component corresponding to the hardware decoding mode by a client of an open media acceleration, or disabling the video driver to stop using the hardware decoding mode; and loading the second component corresponding to the software decoding mode by the client of the open media acceleration, and activating the software decoding library.

6. The method of claim 5, wherein the first component is a hardware component corresponding to the hardware decoding mode at the open media acceleration (OpenMAX), the second component is a software component corresponding to the software decoding mode at the OpenMAX.

7. The method of claim 1, wherein the first decoding mode is the software decoding mode, and the decoding exception comprises at least one of followings: a processor load exceeding a predetermined value in decoding, a frame loss exceeding a default value, a decoding completion time being later than a decoding display time.

8. The method of claim 7, wherein the decoding the video file using the first decoding mode, comprises:
loading a second component corresponding to the software decoding mode;
calling a software decoding library through the second component to software-decode the video file;
wherein the switching the current first decoding mode to the second decoding mode automatically, comprises:
when the occurred decoding exception is detected in the first decoding process using the first decoding mode, stopping using the software decoding mode, loading a first component corresponding to the hardware decoding mode and activating a video driver.

9. The method of claim 8, wherein the stopping using the software decoding mode, loading the first component corresponding to the hardware decoding mode and activating the video driver, comprises:
unloading the second component corresponding to the software decoding mode by a client of an open media acceleration, or disabling the software decoding library to stop using the software decoding mode, and loading the first component corresponding to the hardware decoding mode by the client of the open media acceleration and activating the video driver.

10. The method of claim 9, wherein the first component is a hardware component corresponding to the hardware decoding mode at the open media acceleration (OpenMAX), the second component is a software component corresponding to the software decoding mode at the OpenMAX.

11. An apparatus for video processing, comprising one or more electronic circuit or processors arranged to:
receiving a video file;
decoding the video file using a first decoding mode; and
when an occurred decoding exception is detected in a first decoding process using the first decoding mode, switching the current first decoding mode to a second decoding mode automatically, and continuing to decode a remaining part of the video file using the second decoding mode;
wherein the first decoding mode is a hardware decoding mode and the second decoding mode is a software decoding mode, or the first decoding mode is a software decoding mode and the second decoding mode is a hardware decoding mode;
wherein the continuing to decode the remaining part of the video file using the second decoding mode, comprises:
obtaining current decoding information when the decoding exception occurs, wherein the current decoding information comprises a location of an error frame, and a location of a previous key frame of the error frame wherein the previous key frame of the error frame is decoded by the first decoding mode and not buffered before the switching the current first decoding mode to the second decoding mode automatically; and re-decoding the previous key frame and continuing to decode the remaining part of the video file using the second decoding mode.

12. A terminal comprising a memory, a driver, and a processor, wherein the memory is used for storing instructions set to be executed by the processor;
wherein the instruction to be executed by the processor is used for controlling the driver to process the video file using a video processing method;
wherein the video processing method comprises:
receiving a video file;
decoding the video file using a first decoding mode; and
when an occurred decoding exception is detected in a first decoding process using the first decoding mode, switching the current first decoding mode to a second decoding mode automatically, and continuing to decode a remaining part of the video file using the second decoding mode;
wherein the first decoding mode is a hardware decoding mode and the second decoding mode is a software decoding mode, or the first decoding mode is a software decoding mode and the second decoding mode is a hardware decoding mode;
wherein the continuing to decode the remaining part of the video file using the second decoding mode, comprises:
obtaining current decoding information when the decoding exception occurs, wherein the current decoding information comprises a location of an error frame, and a location of a previous key frame of the error frame, wherein the previous key frame of the error frame is decoded by the first decoding mode and not buffered before the switching the current first decoding mode to the second decoding mode automatically; and
re-decoding the previous key frame and continuing to decode the remaining part of the video file using the second decoding mode.

13. The terminal of claim 12, wherein the first decoding mode is the hardware decoding mode, and the decoding exception comprises at least one of followings: a parsing error of a key field syntax element that occurs in decoding, a decoding time out, a frame loss reaching a ceiling, insufficient hardware resources, a mismatch between video types supported by hardware decoding and video types of video files to be decoded.

14. The terminal of claim 13, wherein the decoding the video file using the first decoding mode, comprise:
loading a first component corresponding to the hardware decoding mode;
calling a video driver through the first component to hardware-decode the video file;
wherein the switching the current first decoding mode to the second decoding mode automatically, comprises:
when the occurred decoding exception is detected in the first decoding process using the first decoding mode, stopping using the hardware decoding mode, and loading a second component corresponding to the software decoding mode, and activating a software decoding library.

15. The terminal of claim 12, wherein the first decoding mode is the software decoding mode, and the decoding exception comprises at least one of followings: a processor load exceeding a predetermined value in decoding, a frame loss exceeding a default value, a decoding completion time being later than a decoding display time.

16. The terminal of claim 15, wherein the decoding the video file using the first decoding mode, comprises:
loading a second component corresponding to the software decoding mode;
calling a software decoding library through the second component to software-decode the video file;
wherein the switching the current first decoding mode to the second decoding mode automatically, comprises:
when the occurred decoding exception is detected in the first decoding process using the first decoding mode, stopping using the software decoding mode, loading a first component corresponding to the hardware decoding mode and activating a video driver.

* * * * *